US011511413B2

(12) United States Patent
Mavrin et al.

(10) Patent No.: US 11,511,413 B2
(45) Date of Patent: Nov. 29, 2022

(54) SYSTEMS AND METHODS FOR LEARNING REUSABLE OPTIONS TO TRANSFER KNOWLEDGE BETWEEN TASKS

(71) Applicants: Borislav Mavrin, York (CA); Daniel Mark Graves, Edmonton (CA)

(72) Inventors: Borislav Mavrin, York (CA); Daniel Mark Graves, Edmonton (CA)

(73) Assignee: Huawei Technologies Co. Ltd., Shenzhen (CN)

( * ) Notice: Subject to any disclaimer, the term of this patent is extended or adjusted under 35 U.S.C. 154(b) by 348 days.

(21) Appl. No.: 16/900,291

(22) Filed: Jun. 12, 2020

(65) Prior Publication Data

US 2021/0387330 A1 Dec. 16, 2021

(51) Int. Cl.
*B25J 9/16* (2006.01)
*G06N 3/08* (2006.01)

(52) U.S. Cl.
CPC ............... *B25J 9/161* (2013.01); *G06N 3/08* (2013.01)

(58) Field of Classification Search
CPC .................................. B25J 9/161; G06N 3/08
See application file for complete search history.

(56) References Cited

U.S. PATENT DOCUMENTS

| | | | |
|---|---|---|---|
| 2019/0385091 A1 | 12/2019 | Munawar et al. | |
| 2020/0097015 A1* | 3/2020 | Keselman | ............ G05D 1/0088 |
| 2020/0193271 A1* | 6/2020 | Allen | ....................... G06N 3/08 |
| 2020/0249674 A1* | 8/2020 | Dally | .................... G05D 1/0088 |
| 2022/0014963 A1* | 1/2022 | Yeh | ......................... G06N 7/005 |
| 2022/0124543 A1* | 4/2022 | Orhan | ...................... G06N 3/08 |
| 2022/0180178 A1* | 6/2022 | Tasinga | ............... G06F 11/3447 |

FOREIGN PATENT DOCUMENTS

| | | | | |
|---|---|---|---|---|
| CN | 108536011 A1 | 9/2018 | | |
| CN | 109085751 A1 | 12/2018 | | |
| CN | 110174118 A1 | 8/2019 | | |
| WO | WO-2020119363 A1 * | 6/2020 | .......... | B60W 60/001 |
| WO | WO-2022043512 A1 * | 3/2022 | .......... | G06K 9/6256 |

OTHER PUBLICATIONS

A Review of Robot Learning for Manipulation: Challenges, Representations, and Algorithms (Year: 2021).*

(Continued)

*Primary Examiner* — Mohammad K Islam

(57) ABSTRACT

A robot that includes an RL agent that is configured to learn a policy to maximize the cumulative reward of a task, to determine one or more features that are minimally correlated with each other. The features are then used as pseudo-rewards, called feature rewards, where each feature reward corresponds to an option policy, or skill, the RL agent learns to maximize. In an example, the RL agent is configured to select the most relevant features to learn respective option policies from. The RL agent is configured to, for each of the selected features, learn the respective option policy that maximizes the respective feature reward. Using the learned option policies, the RL agent is configured to learn a new (second) policy for a new (second) task that can choose from any of the learned option policies or actions available to the RL agent.

19 Claims, 5 Drawing Sheets

(56) References Cited

OTHER PUBLICATIONS

Using Trajectory Data to Improve Bayesian Optimization for Reinforcement Learning (Year: 2014).*
Robust Task-based Control Policies for Physics-based Characters (Year: 2009).*
J. a. B. J. A. a. P. J. Kober, "Reinforcement learning in robotics: A survey," The International Journal of Robotics Research, vol. 32, No. 11, pp. 1238-1274, 2013.
M. C. a. B. M. G. a. B. M. Machado, "A laplacian framework for option discovery in reinforcement learning," in Proceedings of the 34th International Conference on Machine Learning—vol. 70, 2017.

* cited by examiner

SYSTEMS AND METHODS FOR LEARNING REUSABLE OPTIONS TO TRANSFER KNOWLEDGE BETWEEN TASKS

TECHNICAL FIELD

The present disclosure generally relates to a robot learning to solve a task in an environment using reinforcement learning, and in particular to a robot which reuses knowledge learned when solving one task within an environment using reinforcement learning to efficiently solve another novel task within the same action space and state space of the environment using reinforcement learning.

BACKGROUND

Reinforcement learning (RL), in the context of artificial intelligence (AI), has been historically implemented using dynamic programming techniques that learns the value of a policy and finds a better policy that maximizes the value. The value estimate and policy estimate are improved iteratively until convergence. Typically, an RL agent learns by interacting with an environment by receiving state and reward of the environment, performing an action on the environment, and receiving how the action affects state and reward of the environment. The RL agent learns a policy that maximizes the value of the current state, which is the expected future cumulative sum of rewards, by performing an action based on the current state, receiving the next state and reward, and improving its policy and estimate of value of the state. The RL agent executes the policy using input from the environment to achieve one or more goals within the environment.

Training RL agents on robots can be a very costly process. Some difficulties that can arise in applying RL to robotics include the following.

Curse of dimensionality: As the number of dimensions of state and action spaces grows, the computation needed for RL grows exponentially. In robotics the problems are usually high dimensional. For example the dimensionality of the state space for a simple robotic arm is around 20 and the action has 7 dimensions.

Curse of Real-World Samples: Many issues can arise from the fact that robots interact with the real world. One such problem is the cost of running experiments which involves the cost of maintenance, damage to the robot from unsafe exploration, human involvement during restarts etc. Another major issue is uncertainty that arises from measurement noise and discretization.

Curse of goal specification: RL algorithms need an explicitly defined reward function that characterizes the desired behavior. Simply specifying a binary reward that the robotic learning agent receives once the task is completed usually is not enough because the robot might never complete the task.

One example approach to reduce the cost of training RL agents in robotics is the reuse of the knowledge (skills) from a previous task to solve a new task. There are two main approaches for learning new tasks from previously learned tasks: i) Explicitly specifying hand engineered rewards and learning the corresponding skills that maximizes those rewards; ii) Imitation/Inverse RL where the skills learn to mimic examples provided. However, both approaches have disadvantages. Manual hand engineering rewards can be a costly process and difficult to scale. Imitation/Inverse RL can suffer from the risk of overfitting to the collected data which impedes generalization.

Many RL agents do not use any prior knowledge when learning a new task. In such RL agents, the RL agent learns to solve each task tabular rasa.

SUMMARY

The present disclosure generally relates to a method which a robot reuses the knowledge learned from solving one task within an environment using reinforcement learning to efficiently solve another novel task within the same action space and state space of the environment using reinforcement learning.

In some example embodiments, the robot includes an RL agent that is configured to learn a first policy to maximize a cumulative reward of a first task. The first policy is learned using a RL algorithm and transition tuples collected in the environment, each transition tuple including state, action, reward of the first policy after taking the action, and next state. In some embodiments, the first policy that is learned using a RL algorithm is modelled as a neural network (referred to hereinafter as policy network) that maps state to action in an action space. In some embodiments, the first policy that is learned using a RL algorithm is the action that maximizes a value function in a given state where the value function is modelled as a neural network (referred to hereinafter as a value network) that maps state and action to value. A feature neural network (hereinafter referred to as feature network) is extracted from the policy network or the value network. The feature network generates features for a given state. The features are then used as pseudo-rewards, called feature rewards. Each feature reward corresponds to the reward of an option policy that the RL agent learns to maximize using the transitions tuples collected in the environment, where each transition tuple includes state, action, feature reward and next state. The RL agent is configured to learn a second policy to maximize a second a future cumulative reward for a second (different) task. The second policy chooses an option policy from the learned option policies. The chosen option policy generates an action for the given state. The second policy is learned using a RL algorithm and transitions tuples collected in the environment, each transition tuple including state, option policy, reward of the second policy after taking the action generated by the option policy, and next state. The second policy is modeled as a neural network (referred to hereinafter as second policy network) that maps state to option policy.

In some example embodiments, the RL agent is configured to select the most relevant features to learn respective option policies from. The features can be selected based on the variance of each feature.

An advantage of the RL agent is that learning tabular rasa is avoided to learn new option policies for new tasks within the same environment.

Another advantage is that the RL agent efficiently learns the new (second) policy by reusing the option policies learned from the first policy.

In some example embodiments, the RL agent selects those features with high variance for the learning of their respective option policy. For example, the RL agent selects those features that have a variance above a specified threshold. In another example, the RL agent ranks the features by variance and selects a specified number of features having the highest variance.

In some example embodiments, the feature network is a sub-network of the policy neural network and the feature network is configured to minimize a decorrelating regularizer loss function causing the feature network to generate features that are minimally correlated from each other.

Another example embodiment is a method that includes: learning a first policy to maximize a cumulative reward of a first task. The first policy is learned using a RL algorithm and transition tuples collected in the environment, each tuple including state, action, reward of the first policy after taking the action, and next state. The method also includes extracting a feature network from the neural network used to learn the first policy. The feature network outputs features in a given state. The method also includes computing the variance of each feature output by the feature network; selecting at least one feature of the features based on the computed variance. The method also includes, for each selected feature, learning an option policy from transition tuples collected in the environment, each transition tuple comprising state, option policy, feature reward and next state that maximizes a cumulative feature reward of the selected feature; and learning a second policy to maximize a future cumulative reward for a second (different) task. The second policy chooses an option policy from the learned option policies. The chosen option policy generates an action for the given state. The second policy is learned using a RL algorithm and transitions tuples collected in the environment, each transition tuple including state, option policy, reward of the second policy after taking the action generated by the option policy, and next state. The second policy is modeled as a neural network (referred to hereinafter as second policy network) that maps state to option policy.

Another example embodiment is a RL agent which includes memory, and a processing unit configured to execute instructions stored in the memory to perform the described methods.

Another example embodiment is a non-transitory computer-readable medium having instructions stored thereon, which when executed by a processor of a processing device cause the processing device to perform the described methods.

BRIEF DESCRIPTION OF THE DRAWINGS

For a more complete understanding of example embodiments, and the advantages thereof, reference is now made to the following detailed description taken in conjunction with the accompanying drawings, in which.

Similar reference numerals may have been used in different figures to denote similar components.

DETAILED DESCRIPTION

Figure 1:
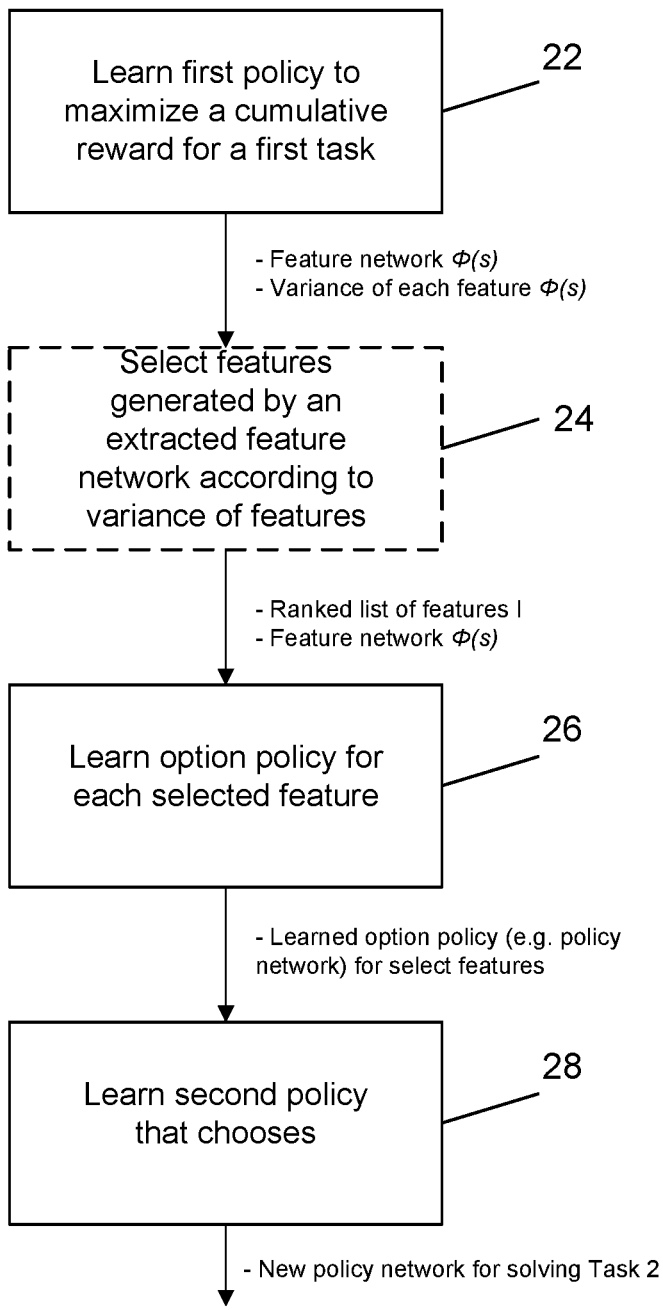
FIG. 1 is a flow diagram of a method of learning and transferring option policies for a robot, in accordance with an example embodiment.

The following terms may be used in example embodiments:

Action: A control decision, that may be generated by an RL agent, that causes a robot to interact with the environment Action Space: Set of all possible actions Primitive Action: Low level action that takes one step to execute. An example of a primitive action is a steering wheel angle.

State space: Set of all possible configurations of the robot

State: A description of the environment that is sufficient to predict future states in the environment given the next action without any other information, i.e., no historical states are needed.

Transition Probability: Probability of transition from one state to another state given an action Reward: A real valued function defined for all possible (state, action, next state) triples Feature: describes an aspect of the State Feature reward: a feature that is used as a reward describing a task to maximize that feature Environment: The world that the agent interacts with. The RL agent often models a task in the environment as an MDP.

Task: In RL this is usually modelled as an MDP where the goal of the agent is to maximize cumulative reward. An alternative way to define a task is to reach a goal-state within the environment.

Related tasks: A collection of tasks within the environment where each MDP differs in the reward definition. The state definition may change among tasks as well but we assume that we can approximate state for each of the tasks using the same set of observations shared among all tasks.

RL: Reinforcement Learning

Transfer Learning: Generalization across RL tasks that share state and action representations Markov decision process (MDP): a collection of State Space, Action Space, Transition Probabilities and Reward Policy: A decision rule that specifies an action given a state Option: an option is defined by a policy, termination function and initiation set. The initiation set describes when the option can be invoked and the termination function outputs a probability of termination. An option is a policy that can be executed for multiple time steps before terminating and switching to another option.

The present disclosure generally relates to a robot that includes an RL agent that controls the robot to interact with an environment. In order to control the robot to interact with the environment, the RL agent receives the current state of the environment, computes the reward corresponding to the current state, and generates an action from an action space based on the current state. The RL agent provides the generated action to a controller of the robot. The controller of the robot generates a control signal for actuators of the robot to cause the robot to perform the action in the environment.

The environment may be a simulated environment and the robot may be implemented as one or more computer programs interacting with the simulated environment. For example, the simulated environment may be a video game and the robot which includes an RL agent may be a simulated user playing the video game. As another example, the simulated environment may be a motion simulation environment, e.g., a driving simulation or a flight simulation, and the RL agent is a simulated driver navigating the robot through a motion simulation. In these implementations, the actions may be points in a space of possible control inputs to control the robot.

Alternatively, the environment may be a real-world environment and the robot is a mechanical device interacting with the real-world environment. For example, the RL agent controls a robot interacting with the environment to accomplish a specific task. As another example, the robot may be a vehicle and the RL agent controls the vehicle to navigate autonomously or semi-autonomously in the environment. In these implementations, the actions are taken from an action space that includes all possible actions to control the robot.

In some examples, the observed state of the environment is represented using low-dimensional feature vectors that characterize the environment. In these examples, values of different dimensions of the low-dimensional feature vectors may have varying ranges.

In some other examples, the observed state of the environment is represented using high-dimensional pixel inputs from one or more images that characterize the environment, e.g., images of the simulated environment or images captured by one or more sensors of the mechanical agent as the mechanical agent interacts with the real-world environment.

Figure 2A:
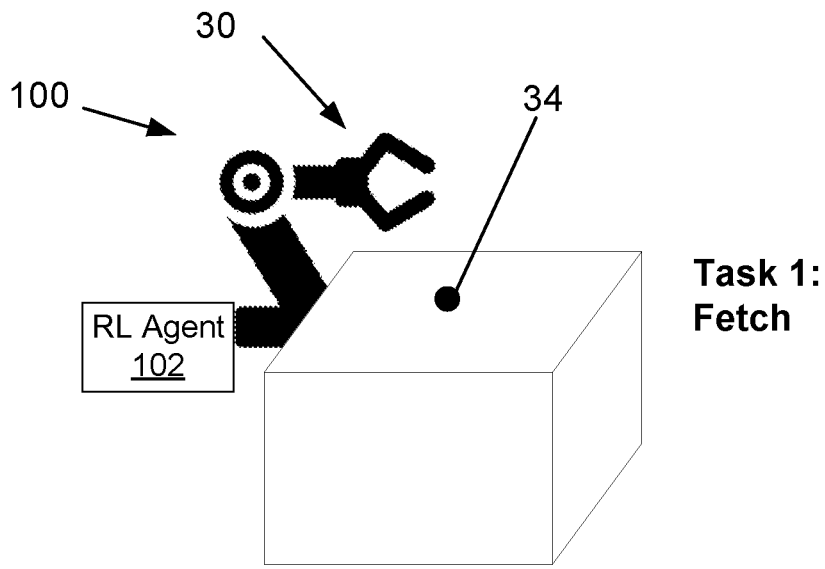
FIG. 2A illustrates a perspective view of the robot learning a first task in an environment, in accordance with an example embodiment.
Figure 2B:
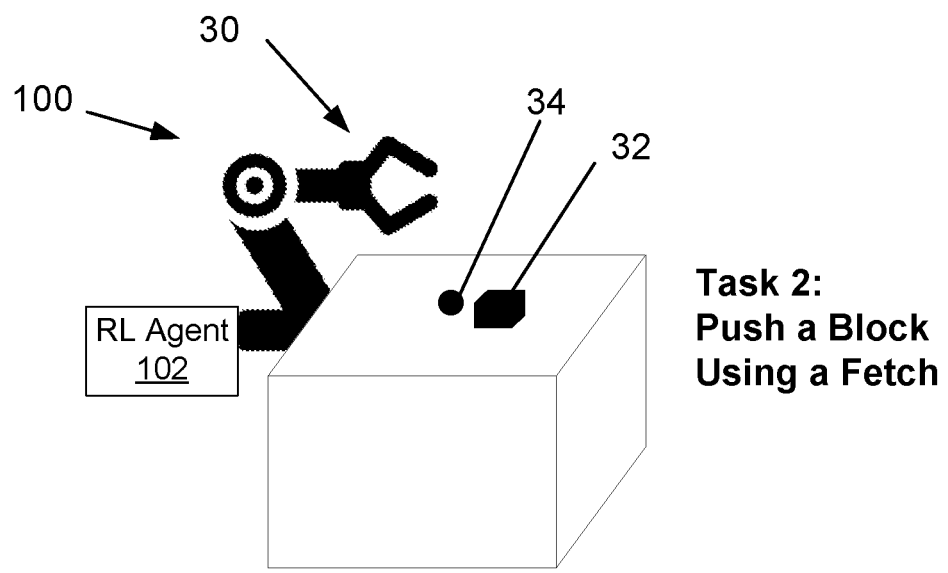
FIG. 2B illustrates a perspective view of the robot learning a second related task within the same environment as FIG. 10A, in accordance with an example embodiment.

Reference is now made to FIGS. 1, 2A and 2B. FIG. 1 illustrates a flowchart of a method 20 of learning and transferring option policies. FIGS. 2A and 2B illustrates an example robot 100, which includes an RL agent 102 configured to perform the method 20.

Referring now to FIGS. 2A and 2B, an example of the robot 100 that includes an RL agent 102 is illustrated. In FIGS. 2A and 2B, the robot 100 is a robotic arm 30. However, it will be appreciated that the robot 100 may be any include any suitable mechanical device that can be controlled to perform a particular task in an environment, such as a vehicle, vacuum, an assembly robot, and the like. FIG. 2A illustrates the RL agent 102 controlling the robot 100 to perform the first task (Task 1) in the environment and FIG. 2B illustrates the RL agent 102 controlling the robot 100 to perform the second task (Task 2) that is related to the first task in the same state space and action space of the environment. The second task is a different task than the first task. The robot 100 may also include a controller (not shown) and one or more actuators (not shown) for controlling the robotic arm 30.

The RL agent 102 of the robot 100 is configured to reuse knowledge required to solve a first task (e.g., Task 1) in order to solve a second related task (e.g., Task 2). This is generally known as transfer learning. For example, a task is a problem that needs to be solved in an environment to achieve some sort of goal (measurable by way of maximizing cumulative reward). Two tasks are related if they are within the same state space and action space of the environment, and solving those tasks can involve similar kinds of actions and skills to achieve their respective goal (measurable by way of a respective cumulative reward). The RL agent 102 of the robot 100 is learning transferrable skills. Skills that are useful in solving one task can be used to solve another different task. Skills are defined as options in reinforcement learning and focus on learning the policies corresponding to those options are referred to as option policies.

In an example embodiment, the RL agent 102 is configured to learn skills (i.e., option policies) required to solve the first task. The learned skills can be performed in series in such a way that the RL agent 102 can solve more complex tasks, or different tasks. An example of two tasks performed by the robotic arm 30 of the robot 100 illustrated in FIGS. 2A and 2B are: Task 1 (FIG. 2A): Move a fetch of the robotic arm to a goal position 34; and Task 2 (FIG. 2B): Push a block 32 to the goal position 34 by a robotic fetch.

The RL agent 102 can reuse the knowledge learned from solving Task 1 in solving Task 2. Task 1 and Task 2 are referred to as being related tasks because the robotic arm 30 operates in the same state space and action space, and solving those tasks can involve similar kinds of actions and skills. The difference between the two tasks is in the specific goal (and the associated cumulative reward) to be reached. In the present example, different tasks and goals are to be achieved by the robotic arm 30. In example embodiments, the RL agent 102 is configured to learn an option policy for every feature reward selected and generated by the feature neural network extracted from the learned policy neural network that solves Task 1. The RL agent 102 is configured to reuse at least one of the option policies in the set of option policies learned by the RL agent to solve part of Task 2.

In some example embodiments, the set of option policies learned by the RL agent 102 are minimally redundant and minimally correlated. In an example embodiment, the set of option policies learned by the RL agent 102 are non-redundant and uncorrelated. For example, the terminal states for each option policy learned by the RL agent 102 can be different and unique. A terminal states occurs when the RL agent 102 has either achieved the goal or has not. A terminal state is the last state the RL agent 102 was in when one of many possible terminal conditions is met. The terminal conditions includes goal achieved, death, collision, timeout, out of bound, and the like.

Referring again to FIG. 1, the method 20 of learning and transferring option policies for the robot 100 is now described in greater detail, in accordance with an example embodiment. The method 20 includes four steps 22, 24, 26, 28 described in further detail below. The method 20 is implemented as software that is executable by a processor (not shown) of the robot 100. The software that implements the method 20 may include a routine (otherwise known as procedure or function) for implementing each of the steps 22, 24, 26, 28 of the method 20. Coding of the software for carrying out the method 20, including each coding of the routines corresponding to the steps 22, 24, 26, 28, is well within the scope of a person of ordinary skill in the art having regard the present disclosure. In some embodiments, the RL agent 102 includes the software that implements the method 20 and the computer-readable code or instructions of the software that implements the method 20 is executable by a processor of the robot 100. In some embodiments, the RL agent 102 includes software that implements the method 20 and hardware that includes memory and one or more processors. In this embodiment, computer-readable code or instructions of the software that implements the method 20 is stored in the memory of the RL agent 102 and executable by the one or more processors of the RL agent 102. In some embodiments, computer-readable code or instructions of the software that implements the method 20 may be stored in a computer-readable medium.

The method 20 begins at step 22. At step 22, the method 20 solves the first task (Task 1) by learning a first policy $\pi(s)$ to maximize a cumulative reward of the first task (Task 1). The first policy is learned using a RL algorithm and state transition tuples collected in the environment, where each state transition tuple includes a state s, an action a, a reward of the first policy after taking the action a, and the next state after taking the action a. The first policy π(s) that is learned is modeled as neural network (referred to a policy network) that maps state s to action a. The first policy π(s) is defined by π(s)=f[φ(s|w)|θ], where φ(s|w) is feature neural network (referred to hereinafter as a feature network). The feature network is a hidden layer of the first policy network and thus may be considered to a subnetwork of the policy network π(s). The feature network φ(s|w) generates features, parameterized by w. The first policy π(s) maps the features generated by the feature network φ(s|w) to an action parameterized by θ. The feature network φ(s|w) generates features and outputs a vector of the generated features (referred to as a feature vector) of length n. The features generated by the feature network φ(s|w) are constrained to be minimally correlated with each other during learning by a decorrelating regularizer. The decorrelating regularizer minimizes the covariance of the features generated by the feature network φ(s|w). In some embodiments, the decorrelating regularizer may be omitted, however, this could result in the features generated by the feature network φ(s|w) being highly correlated.

In some embodiments, the features generated by the feature network φ(s|w) may be constrained to be minimally correlated using other algorithms, such as those described in in, H. Y. L. K. B. Mavrin, "Deep Reinforcement Learning with Decorrelation," 8 May 2019. [Online]; Available: https://arxiv.org/abs/1903.07765, and D. G. A. C. B. Mavrin, "Efficient decorrelation of features using Gramian in Reinforcement Learning," 19 Nov. 2019. [Online]; Available: https://arxiv.org/abs/1911.08610 [Accessed 17 Jan. 2020], herein incorporated herein by reference.

When step 22 of the method 20 is performed (e.g., when the code or instructions of the routine that implements step 22 are executed by a processor of the robot or one or more processors of the RL agent 102), the method 20 receives a feature decorrelation regularization parameter lambda, a discount factor gamma control the importance of immediate rewards versus long term rewards, and a reward function for the first task (Task 1). Upon learning the first policy π(s) to maximize a cumulative reward of the first task (Task 1), a feature network φ(s|w) is extracted from the policy network π(s). The method 20 then provides as output: (i) the extracted feature network φ(s|w); and (ii) an estimated variance of each feature generated by the extracted feature network φ(s|w) (which can be called "feature variance"). The method 20 then proceeds to step 24.

In some embodiments, the first policy π(s) that is learned is deterministic and the first policy π(s) is learned using a Deep Q-Network (DQN) algorithm (when actions are discrete actions) or a Deep Deterministic Policy Gradient (DDPG) algorithm (when actions are continuous actions). In some embodiments, the first policy π(s) that is learned is a stochastic policy (e.g. a distribution over the actions conditioned on state) and the first policy π(s) is an action given a state and the first policy π(s) is learned using a proximal policy gradient (PPO) algorithm or a soft actor-critic algorithm.

At step 24, the method 20 selects features generated by the extracted feature network φ(s|w) according to the feature variance of the features. The selection of features at step 24 is as follows. The features are ranked according to their feature variance, in descending order. In some embodiments, features with a feature variance less than a predefined threshold are filtered out (dropped). For example, only the k features with the largest feature variance are selected. In some embodiments, a human expert can manually selects features generated by the feature network using code or an input interface. In some embodiments, the method 20 at step 24 selects all features generated by the feature network φ(s|w) and the selected features are used for generating sub-goals (i.e. when k=n). In example embodiments, setting the threshold as the top k features with k equal to the number of features will select all of the features generated by the extracted feature network φ(s|w). In some the embodiments, step 24 of the method 20 is not performed. In some embodiments, when step 24 is performed (e.g., when the code or instructions of the routine that implements step 24 are executed by a processor of the robot or one or more processors of the RL agent 102), features are selected based on heuristics (e.g. ordering features according to highest feature variance first and removing features with a feature variance lower than a threshold). After step 24 is performed, the method 20 proceeds to step 26.

At step 26, a respective option policy is learned for each of the selected features generated by the extracted feature network φ(s|w). A "feature" pseudo-reward (also called feature reward) is defined with the following reward function:

$$r_i(s_t, a, s_{t+1}) = \phi_i(s_{t+1}) - \phi_i(s_t);$$

for i=1 . . . k where maximizing the value of each feature pseudo-reward represents a sub-goal. Option policies are learned to maximize the features of the k≤n features with the largest feature variance. In some embodiments, the number of option policies learned when step 26 is performed (e.g., when the code or instructions of the routine that implements step 26 are executed by a processor of the robot 100 or one or more processors of the RL agent 102), is constrained by the dimensionality of the extracted feature network # (s|w).

At step 28, a second related task (i.e., Task 2) is solved by learning a second policy that chooses one of the learned option policies given the current state and maximizes the future cumulated reward of the second task (i.e., Task 2). When a learned option policy is chosen by the second policy, the selected learned option policy is executed over one or more time steps (i.e. one or more interactions with the environment). Execution of the selected learned option policy may stop when the future cumulated reward of the selected learned option policy is maximized. In some embodiments, when step 28 is performed (e.g., when the code or instructions of the routine that implements step 28 are executed by a processor of the robot 100 or one or more processors of the RL agent 102), a learned option policy is chosen from an augmented actions space. One or more of the learned option policies in the augmented actions space may be a learned option policy or a primitive action. If the second policy chooses a primitive action from the augmented action space, the selected option policy is only executed for one time step.

As understood in the art, in example embodiments, each time step (t) can be a specific time interval, can be aperiodic, can be event based (e.g., a turn based game or activity), or can be dependent on other internal or external criteria.

The minimal correlation of the learned features ensures the corresponding rewards result in learned option policies with unique terminal conditions and unique behaviors.

Tasks with higher variance are generally easier to learn. This is especially beneficial in robotics due to the above mentioned curse of the goal specification. On the other hand, features with zero variance yield uninteresting tasks where all states are goal states and, therefore, should not be considered for option learning in example embodiments. In general, in some example embodiments, features can be selected according to a specific variance threshold.

Figure 3:
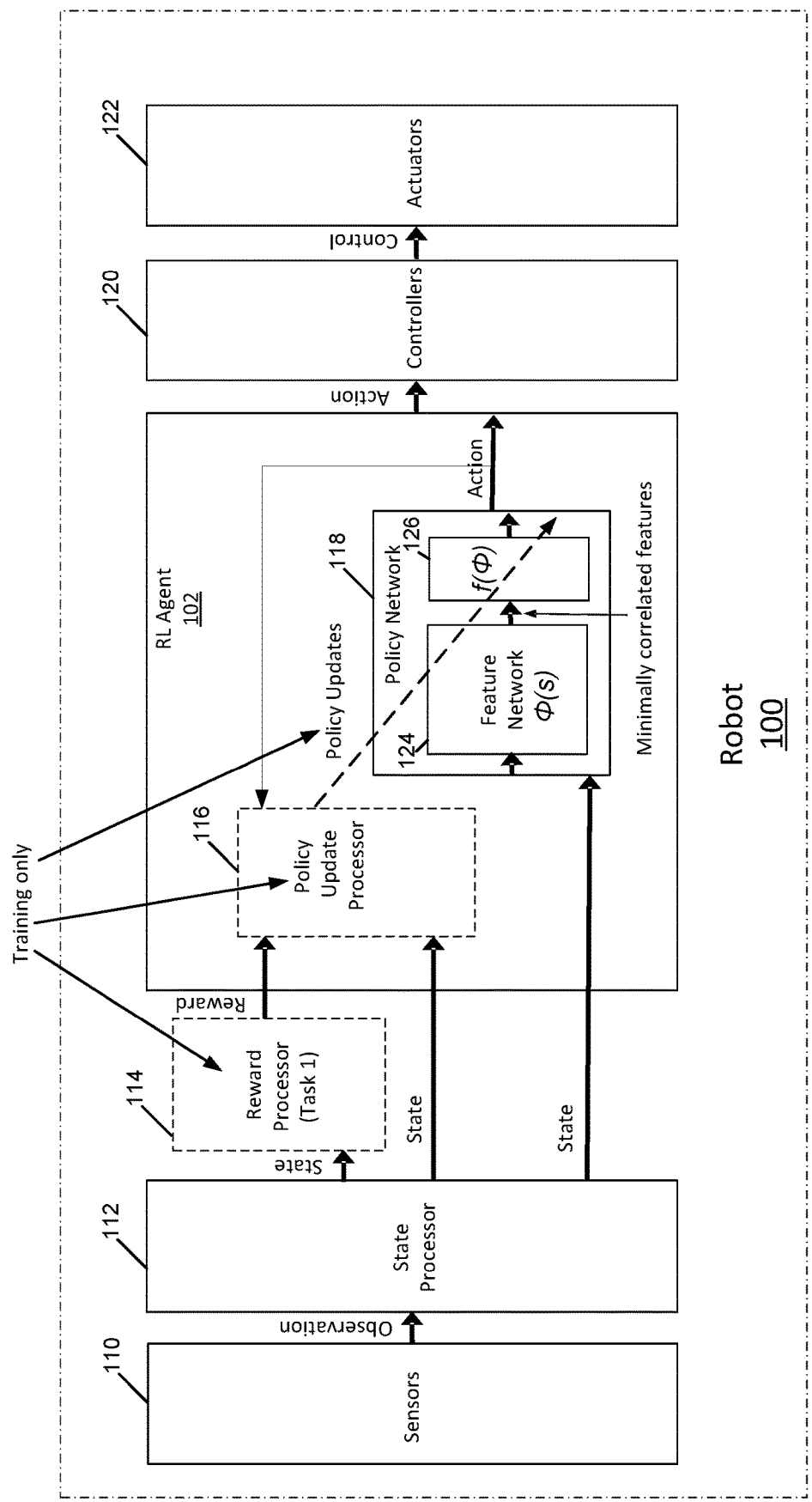
FIG. 3 is a schematic diagram illustrating the robot configured to generate one or more features, in accordance with an example embodiment.

FIG. 3 shows a block diagram of an example robot 100 that includes an RL agent 102 performing step 22 of the method 20 to learn a first policy to maximize a cumulative reward of a first task (Task 1) in accordance with an example embodiment.

The robot 100 includes sensors 110 and a state processor 112. The sensors 110 are configured to sense the environment of the robot 100 as the robot 100 interacts with the environment and generate observations of the environment. The sensors 110 send an observation of the environment to the state processor 112. The sensors 110 can include cameras, detection and ranging sensors, such as Light Detection and Ranging (LIDAR) sensors, accelerometers, thermometers, and the like. The state processor 112 receives the observations of the environment from the sensors 110, processes the observations to generate a state $s_t$ representative of the environment the robot 100, and provides the state $s_t$ to the RL agent 102.

As shown in FIG. 3, the RL agent 102 includes a reward processor 114, a policy update processor 116, and a policy network 118 modelling the first policy $\pi(s)$. The policy network 118 includes hidden layers that form a feature network 124 (e.g., feature network $\phi(s|w)$) that generates features. The first policy $\pi(s)$ modelled by the policy network 118 that maps state $s_t$ to action $a_t$. The policy network 118 has learnable parameters (e.g. weights). The RL agent 102 performs step 22 of the method 20 to learn the first policy $\pi(s)$ as follows. The reward processor 114 receive the state $s_t$ generated by the state processor 112 and computes a reward $r_t$ from the state $s_t$. The reward processor 114 sends the computed reward $r_t$ for the state $s_t$ to the policy update processor 116. The policy update processor 116 receives the current state $s_t$ from the state processor 112 and the reward $r_t$ computed by reward processor 114 (i.e., the reward $r_t$ of the first policy $\pi(s)$ after taking an action $a_t$) and receiving next state $s_{t+1}$. The policy update processor 116 collects state $s_t$, action $a_t$, reward $r_t$, and next state $s_{t+1}$ and creates a transition tuple that is used by an RL algorithm to compute an update for the parameters (e.g., weights) of the policy neural network 118. The computed update for the parameters (e.g. weights) of the policy network 118 is dependent on which RL algorithm is executed by the policy update processor 116. In some embodiments, the policy update processor 116 includes an additional regularization operation in the learning of updates to the parameters (e.g. weights) of the feature network 124 (e.g. feature network $\phi(s|w)$) that is part of the policy network 118 (i.e., are the hidden layers of the policy network 118) to ensure the features generated by the feature network 124 (e.g. feature network $\phi(s|w)$) are minimally correlated with each other. In example embodiments, the state $s_t$ is sufficient to predict future states, $s_{t+1}$, $s_{t+2}, \ldots, s_{t+n}$ in the environment given the next action without any other information. In other words, no historical states are needed to predict future states in the environment given the next action.

In some example embodiments, the first policy $\pi(s)$ learned is an action $a_t$ that maximizes a value function in a current state $s_t$ and the policy network 118 is a value network that maps state and action to value. Example of a value networks include a Deep Q-Network (DQN).

As described above, the RL agent 102 performs step 22 of the method 20 to learn a first policy $\pi(s)$ to maximize a cumulative reward of the first task. The policy network 118 includes hidden layers that form the feature network 124 (e.g. feature network $\phi(s|w)$) and other layers 126 (represented by $f(\phi)$) that maps features generated by the feature network 114 (e.g. feature network $\phi(s|w)$) to an action $a_t$. The features generated by the feature network 124 (e.g. feature network $\phi(s|w)$) may be minimally correlated with respect to each other.

The operation of the robot 100 when step 20 is performed by the RL agent 102 will now be described. The sensors 110 of the robot 100 observes the environment and send an observation of the environment to the state processor 112. The state processor 112 receives the observation of the environment, generates a current states $s_t$ of the environment, and provide the current state $s_t$ to the reward processor 114 and the policy network 118. The reward processor 114 receives the current state $s_t$, computes the reward $r_t$ of the first task (Task 1). The policy network 118 generates an action $a_t$ based on the current state $s_t$. One time step (t) later, in part as a consequence of the action $a_t$ taken by the robot 100, the policy update processor 116 receives the next state $s_{t+1}$ of the environment and generates a transition tuple containing state $s_t$, action $a_t$, reward $r_t$ of the first policy after taking the action, and next state $s_{t+1}$. The policy processor 116 then computes an update of the parameters of the policy network 118 based on transition tuples collected in the environment (including possibly historical transition tuples generated in the past). The policy network 118 outputs an action given the current state to maximize a cumulative reward of the first policy.

The learned policy network 118 (i.e., the policy network 118 whose parameters have been learned) generates an action $a_t$ based on the current state $s_t$ and sends the generated action $a_t$ to the controllers 120. For example, the action $a_t$ generated by may be to move a robotic arm in a particular direction or defined path. The controllers 120 are configured to process each action $a_t$ received from the policy network 118 of the RL agent 102 and send a respective control signal to one or more of the actuators 122 to perform the action $a_t$ (e.g., motor control, electrical activation).

An example of an algorithm (referred to hereinafter as Algorithm 1) performed by step 22 of the method 20 will now be described. The routine that implements step 22 executes Algorithm 1. In this embodiment, the first policy $\pi(s)$ is parameterized by $\theta$ and $w$ and is represented mathematically by $\pi(s)=f[\phi(s|w)|\theta]$, where, $\phi(s|w)$ is the feature network parameterized by $w$. Algorithm 1 is used to learn the first policy $\pi(s)$ that maximizes a value function in a given state. A value function may be obtained from an action-value function $Q(s,a)$. An action-value function $Q(s,a)$ may be modelled as a neural network (e.g. an action-value network) that maps state and action to value. The action-value function $Q(s,a)$ (e.g., the parameters of the action-value network) is learned using a deep q-learning algorithm. An action-value function $Q(s,a)=\phi(s|w)^T W_\alpha$ is learned where $W_\alpha$ is a weight matrix of size $(n, n_a)$ where $n_a$ is the number of actions in the action space. The first policy $\pi(s)$ is then determined as follows:

$$\pi(s) = \underset{\forall a}{\mathrm{argmax}}\, Q(s, a).$$

The sample covariance matrix of the features generated by the feature network $\phi(s|w)$ is defined as:

$\widehat{Cov}_{(\phi(s|w))} = \Phi^T \Phi$.

Here, $\Phi=[\phi(s_1) \ldots \phi(s_N)]^T$ and $\{s_1 \ldots s_N\}$ is a sample of states.

The off diagonal elements of the covariance matrix correspond to sample cross covariances of the features, i.e. for $i>j$ $\widehat{Cov}(\phi)_{ij}=\widehat{cov}(\phi_i, \phi_j)$, therefore features are minimally correlated when off diagonal elements of the $\widehat{Cov}(\phi)$ are zero. Features are minimally correlated when off diagonal elements of the $\widehat{Cov}(\phi)$ are minimized or close to zero. The diagonal elements correspond to the variances of the features. The regularization is an additional loss used in the learning of updates to the parameters (e.g. weights) of the action-value network adds an additional loss term when learning the value function to penalize the off diagonal elements of $\widehat{Cov}(\phi)$, i.e.:

$\Sigma_{i>j} \widehat{cov}(\phi_i,\phi_j)^2$.

The objective of the decorrelating regularizer is combined with the main RL loss. See, for example, H. Y. L. K. B. Mavrin, "Deep Reinforcement Learning with Decorrelation," 8 May 2019 [Online]; Available: https://arxiv.org/abs/1903.07765, and D. G. A. C. B. Mavrin, "Efficient decorrelation of features using Gramian in Reinforcement Learning," 19 Nov. 2019 [Online]; Available: https://arxiv.org/abs/1911.08610 [Accessed 17 Jan. 2020], herein incorporated herein by reference. For DQN, the loss is.

$$L_{RL} = E\left[r + \gamma \max_{a'} Q(s', a'; \theta_{target}) - Q(s, a; \theta_i)\right]^2.$$

Here, Q (s, a; θ) is the Q value function in DQN.

As noted above, the method 20, at step 22, receives λ>0, γ∈[0, 1] and $r_I$ reward for Task 1. Algorithm 1 includes the following steps:

At step 1: Initialize deep policy $\pi(s)=f[\phi(s|w)|\theta]$.
At step 2: Sample initial state from a distribution s~v(s).
At step 2.1: Initialize s'=s.
At step 3: While s' is not terminal do steps 3.1 to 3.6:
At step 3.1: Choose an action a←π(s).
At step 3.2: Take action a, observe $r_I$, s'.
At step 3.3: Store transition (s, a, $r_I$, s') in replay buffer D.
At step 3.4: Sample b transitions (mini batch) from replay buffer D, i.e. {(s, a, $r_I$, s')$_b$}~D.
At step 3.5: Update policy weights w, θ by minimizing the loss $L_{RL}$ ($\pi|\{(s, a, r_I, s')_b\}$)+$\lambda\Sigma_{i>j}$ cov[$\phi_i,\phi_j|\{s_b\}$]$^2$ over the mini-batch via gradient descent method (e.g., maximizing the cumulative reward $r_I$ for Task 1).
At step 3.6: Update s=s'.
At step 4: Estimate variance of each feature i=1 ... n over replay buffer D of size N, i.e. $\forall i \in \{1 \ldots d\}$ $\hat{\sigma}_i^2$=var[$\phi_i(s_N)$]].

As noted above, the feature network $\phi(s|w)$ are the hidden layers of the first policy network π(s) and thus are a subnetwork of the policy network 118. Step 22 extracts the feature network $\phi(s|w)$ i from the first policy network 118 and outputs the extracted feature network and the estimated feature variances $\{\hat{\sigma}_i^2\}$; for i=1 ... n.

An example of an algorithm (referred to hereinafter as Algorithm 2) performed by step 24 of the method 20 will now be described. The routine that implements step 24 executes Algorithm 1. As noted above, at step 24, the extracted feature network $\phi(s|w)$, and the estimated feature variances $\{\hat{\sigma}_i^2\}$ for i=1 ... n are received. Features generated by the feature network $\phi(s|w)$ are ranked and selected with respect to the corresponding feature variances $\{\hat{\sigma}_i^2\}_i$ for i=1 ... n. For example, features with zero variance will generate zero feature rewards which will generate a trivial sub-goal. In some embodiments, such features are not selected and can be filtered out. In addition, a human expert can provide further insight into 'usefulness' of features by studying activation maps for each feature using, for example, Grad-CAM approach as described in R. R. a. C. M. a. D. A. a. V. R. a. P. D. a. B. D. Selvaraju, "Grad-cam: Visual explanations from deep networks via gradient-based localization," in *Proceedings of the IEEE International Conference on Computer Vision* (2017), incorporated herein by reference. The RL agent 102, at step 24, can receive information related to which features to learn by way of received code. Alternatively, a user, using a user input interface of a computing device, can select which features are to be learned and the RL agent can receive, from the computing device, information related to which features to learn.

Algorithm 2 includes the following steps:
At step 1: Rank features in descending order by corresponding feature variances I={i|$\hat{\sigma}_i^2 \geq \hat{\sigma}_{i+1}^2$}.
At step 2: Select features with variance above a fixed threshold I←{i∈I|$\hat{\sigma}_i^2 > \sigma_{threshold}$}.
At step 3: Remove all but the k-top features ordered by variance I←{i∈I|i≤k}.

The output generated by Algorithm 2 is a reduced feature set I, which are ordered by feature variance (greatest to lowest).

In some embodiments, routine 24 is optional. In some embodiments, routine 24 is performed after routine 26 rather than before. In such embodiments, all of the features generated by the feature network $\phi(s|w)$ are ranked and selected.

Figure 4:
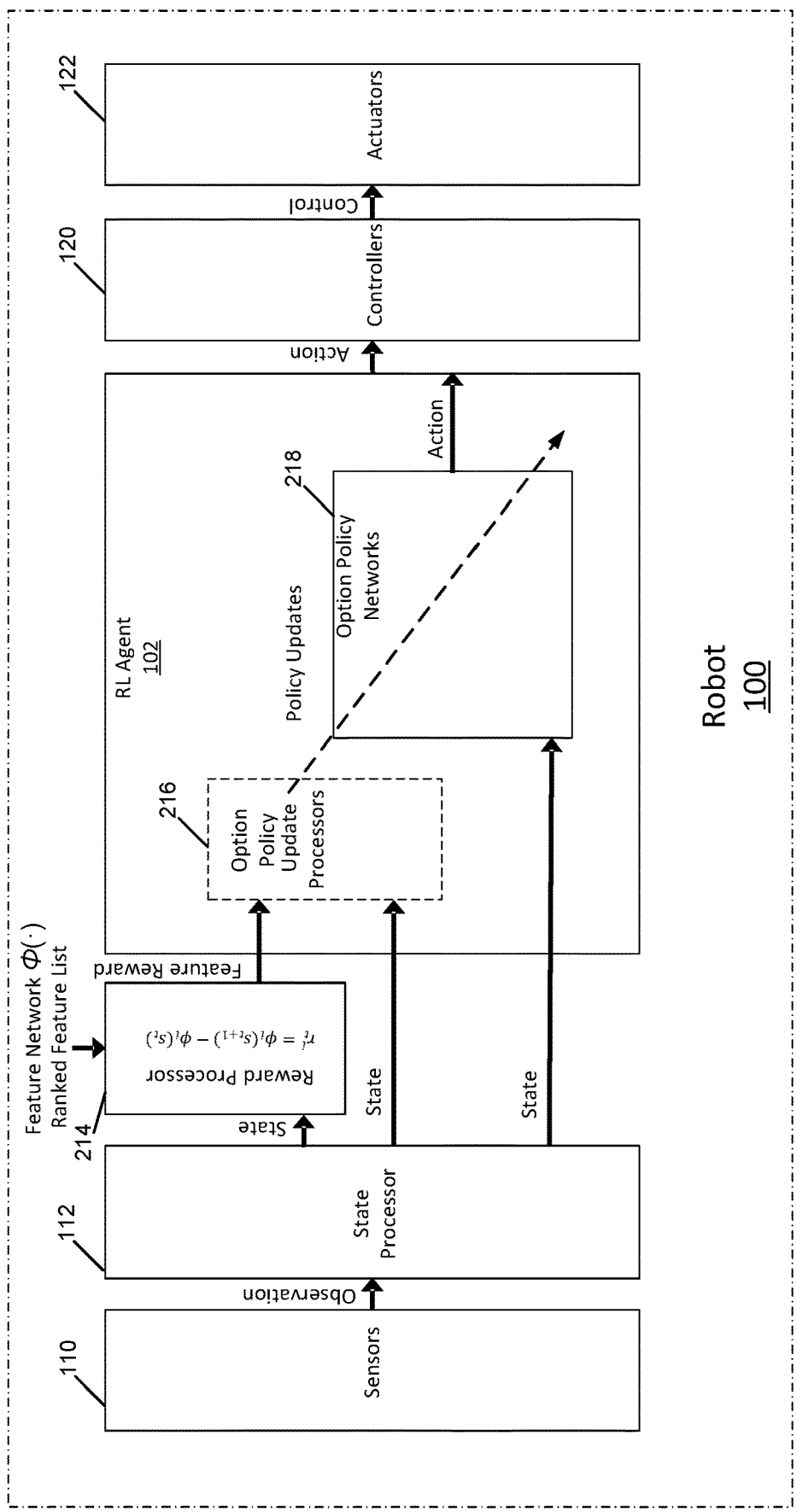
FIG. 4 is a block diagram implementation of the robot for learning an option policy for one of the features generated from operation of the robot as in FIG. 3, in accordance with an example embodiment.

Referring now to FIG. 4, a block diagram of an example robot 100 that includes an RL agent 102 performing step 26 of the method 20 to learn an option policy for each selected feature in accordance with an example embodiment is shown. In FIG. 4, the RL agent 102 learns an option policy for each selected feature and stores the learned option policy for each selected feature to be used later (e.g. when step 28 is performed by RL agent 102 (see FIG. 5)). The RL agent 102 learns an option policy (e.g., option$_1$, option$_2$, ..., option$_n$) for each selected feature $\phi_i$ generated by the feature network $\phi(s|w)$. The robot 100 shown in FIG. 4 includes the same components as the robot 100 shown in FIG. 3 (i.e., the sensors 110, the state processor 112, the reward processor 114, the one or more controllers, 120, and the actuator 122). The robot 100 also includes a feature reward processor 214. The RL agent 102 of the robot 100 shown in FIG. 4, in addition to the components shown in FIG. 3 (which are not illustrated in FIG. 4 for ease of illustration), includes multiple option policy update processors 216 and multiple neural networks 218. Each respective option policy (option$_1$) is modelled by one of the multiple neural networks 218 (which are referred to hereinafter generally as option policy networks 218 and individual as option policy network 218) that maps state $s_t$ to action $a_t$. Each option policy network 218 has learnable parameters (e.g. weights). The option policy update processors 216 are associated with the option policy networks 218 in a one-to-one manner (i.e., each option policy update processor 116 is associated with one of the option policy networks 218). The RL agent 102 stores the learned option policies (option$_1$) for each selected feature #t for use when the RL agent 102 performs step 28 of the method 20.

In the example shown in FIG. 4, the feature $\phi_i$ which has the highest feature variance is first selected for learning an option policy$_1$. For example, the feature $\phi_i$ that has the highest feature variance is identified using an argmax function of the feature variances generated at step 22. After learning an option policy for the feature $\phi_i$ that has the highest feature variance, the RL agent 102 then learns an option policy for the feature having the next highest feature variance using a similar argmax function (excluding option$_1$), and so on, until all of the selected features are used for learning the respective option policies. The last feature that is selected for learning an option policy (option policy$_n$) is the feature $\phi t$ that has the lowest feature variance t.

Each option policy is learned by having the robot 100 interact with the environment. The feature reward processor 214 receives, as input, the ranked list of the selected features generated at step 24, and the feature network $\phi(s|w)$ generated at step 22. The feature reward processor 214 receives a current state from the state processor 112 and outputs a pseudo-reward that relates to a feature selected from the ranked feature list. The policy update processor 216 receives the feature reward and the current state and runs an option policy and updates the policy network 118 by storing parameters of each individually learned option policy to the policy network 118. For each selected feature, the RL agent 102 learns the individual option policy from state transition tuples collected in the environment of state, action reward and next state tuples that maximize the cumulative feature reward (pseudo-reward).

Given a set of features I generated at step 24, a set of corresponding feature reward functions $\{r_i|i \in I\}$ is determined as follows:

$$r_t^i(s_t, a, s_{t+1}) = \phi_i(s_{t+1}) - \phi_i(s_t).$$

The feature reward function $r_t^i$ forms a sub-goal to maximize a selected feature $\phi_i$. For each sub-goal, a corresponding option policy (option$_1$) is learned.

An example of an algorithm (referred to hereinafter as Algorithm 3) performed by step 26 of the method 20 will now be described. The routine that implements step 26 executes Algorithm 3. Algorithm 3 generates option policies for each selected feature $\{\pi_i|i \in I\}$. Algorithm 3 includes the following steps:

Step 1 is performed for each feature $i \in I$, learn corresponding option policy $\pi_i(s)$, and includes steps 1.1 to 1.3:
At step 1.1: Initialize option policy $\pi_i(s|w_i)$.
At step 1.2: Sample initial state from a distribution $s \sim v(s)$.
At step 1.2.1: Initialize $s'=s$.
At step 1.3: While s' is not terminal do steps 1.3.1 to 1.3.7 as follows:
At step 1.3.1: Choose an action $a \leftarrow \pi_i(s)$.
At step 1.3.2: Take action a, observe s'.
At step 1.3.3: Compute reward $r_i(s, a, s')=\phi(s')-\phi_i(s)$ for feature i.
At step 1.3.4: Store transition (s, a, $r_i$, s') in replay buffer D.
At step 1.3.5: Sample b transitions (mini batch) from replay buffer $\{(s, a, r, s')_b\} \sim D$.
At step 1.3.6: Update option policy weights $w_i$ minimizing the loss $L_{RL}(\pi|\{(s,a,r,s')_b\})$ over the mini-batch using gradient descent method (e.g. maximizing the reward).
At step 1.3.7: Update $s=s'$.
Algorithm 3 generates an option policy for each selected feature $\{\pi_i|i \in I\}$.

Figure 5:
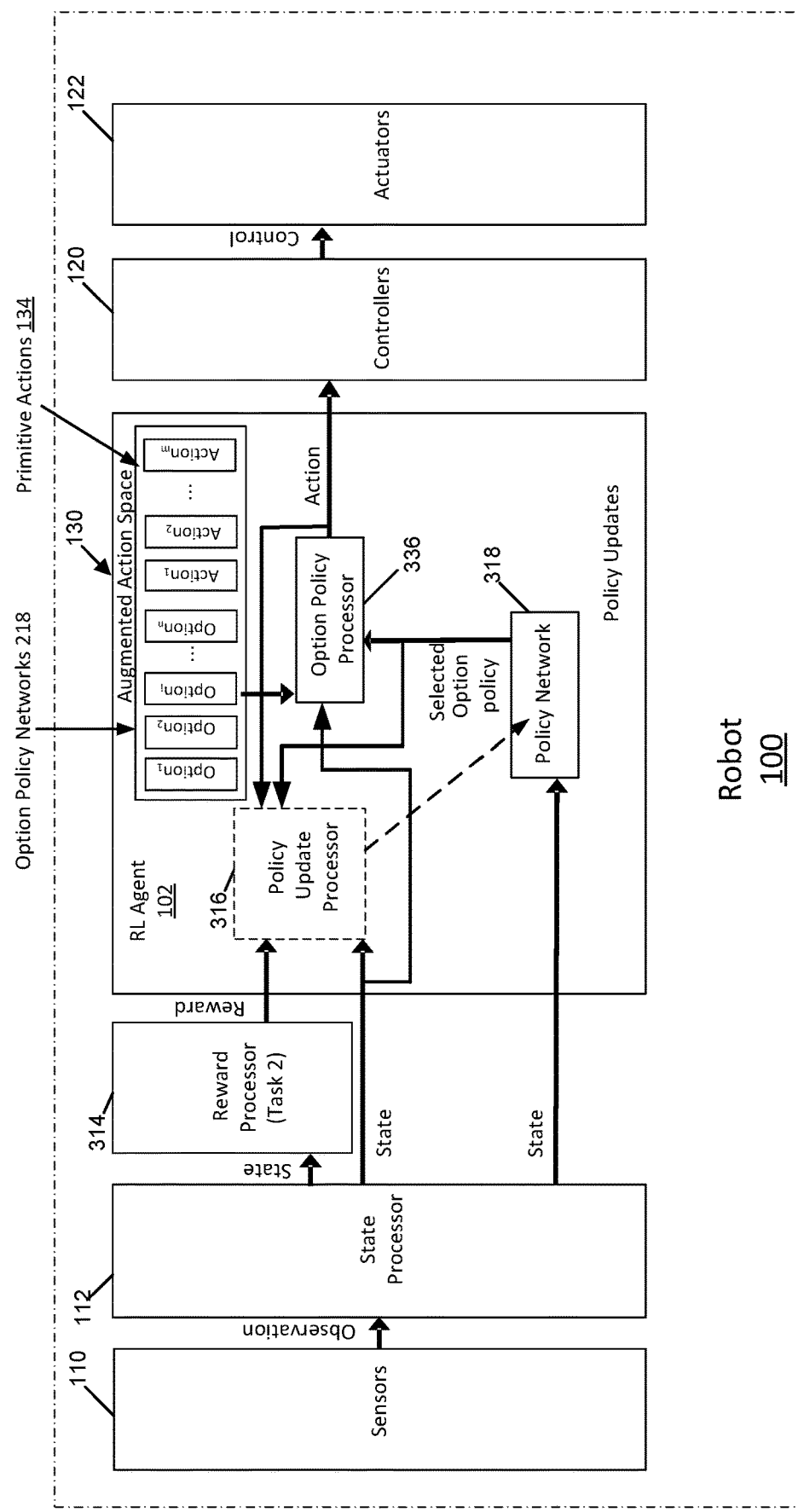
FIG. 5 is a block diagram implementation of the robot for learning a new policy that is constructed from one or more of the learned option policies generated from operation of the robot as in FIG. 4 to achieve a new task, in accordance with an example embodiment.

Referring now to FIG. 5, a block diagram of an example robot 100 that includes an RL agent 102 performing step 28 of the method 20 to learn a second policy to maximize a second cumulative reward of a second task (Task 2). The second task is different than the first task (Task 1). The robot 100 shown in FIG. 5 includes the same components as the robot 100 shown in FIG. 3 (i.e., the sensors 110, the state processor 112, the reward processor 114, the one or more controllers, 120, and the actuator 122). The robot 100 also includes a reward processor 314. The RL agent 102 of the robot 100 shown in FIG. 5, in addition to the components shown in FIGS. 3 and 4 (which are not illustrated in FIG. 5 for ease of illustration), includes a policy update processor 316, an option policy processor 336, and a policy network 318 modelling the second policy $\mu$.

As noted above with regards to step 28, the RL agent 102 receives the option policies (e.g., option$_1$, . . . , option$_n$) and forms an augmented action space 130 that includes the learned option policies (e.g. the option policies learned at step 26) and a set of primitive actions 134 that are available to the RL agent 102 for the second task (Task 2). The set of primitive actions includes m primitive actions (e.g. action$_1$, action$_2$, . . . , action$_n$). Thus, the RL agent 102 shown in FIG. 5 includes the augmented actions space 130 from which the policy processor 318 can select one of the n option policies (e.g., option$_1$, . . . , option$_n$) or m primitive actions (e.g. action$_1$, action$_2$, . . . , action$_n$). The second policy $\mu$ maps state to action and is modelled by a neural network (policy network 318) that chooses one of the n option policies (e.g., option$_1$, . . . , option$_n$) given the current state, or optionally one or more of the m primitive actions (e.g. action$_1$, action$_2$, . . . , action$_n$).

The reward processor 314 receives the current state of the environment from the state processor 112. From the current state, the reward processor 314 computes a reward of a second task (Task 2) which is used by the RL agent 102 to learn the second policy $\mu$ that maximizes the cumulative reward of the second task (Task 2).

In FIG. 5, the policy network 318 chooses (i.e. selects) one of the option policies 218 or primitive actions m primitive actions (e.g. action$_1$, action$_2$, . . . , action$_n$) from the augmented actions space 130. When one of the option policies 218 is selected, the option policy processor 336 takes the selected option policy, receives the current state from the state processor 112, and outputs actions to be executed by the robot 100. The option policy processor 336 generates actions based on the current state until a termination condition is reached. The option policy processor 336 may terminate generating actions based on the current state in one step or the option policy processor 336 may terminate generating actions based on the current state when the future reward of the selected option policy 218 is maximized.

The option policy processor 336 is only invoked if an option policy is selected from the augmented action space 130. If a primitive action is selected from the augmented actions space 130, the option policy processor 336 receives the selected primitive action (e.g. action$_1$) and outputs the selected primitive action (e.g. action$_1$). The RL agent 102 outputs the primitive action (e.g. action$_1$) to be performed by the robot 100.

In the present example, given the received state $s_t$ and reward $r_t$, the second policy $\mu$ learns which option$_1$ to choose from the available option policies and primitive actions. For other possible instances of the received state $s_t$ and reward $r_t$, not shown here, the second policy $\mu$ may learn to select a different option policy, e.g. any of the other available option policies other than option$_1$, such as option$_1$, option$_2$, . . . , option$_n$, or may choose from any of the primitive actions.

An example of an algorithm (referred to hereinafter as Algorithm 4) performed by step 28 of the method 20 will now be described. The routine that implements step 28 executes Algorithm 4. As described above, at step 28, option policies $\{\pi_i|i \in I\}$, $\lambda > 0$, $\gamma \in [0,1]$, and $r_{II}$ reward for Task 2 are received. Step 28 outputs a new (e.g. second) policy $\mu$ that maximizes the cumulative reward of the second task (Task 2). As mentioned, the potential option policies (option$_1$, option$_2$, . . . , option$_n$) that are selectable for learning the second policy $\mu$ can also include the primitive actions 134 which are preset or preprogrammed.

At step 1: The original action space is extended with the set of option policies $\{\pi_i\}_{i=1}^k$ learned at step 26, i.e. new augmented action space $A^+$ is generated where $A^+ = A \cup \{\pi_i\}_{i=1}^k$ At step 2: Initialize policy $\mu(s|w_\mu):S \rightarrow A^+$.

At step 3: Sample initial state from a distribution $s \sim v(s)$.

At step 3.1: Initialize $s'=s$.

At step 4: While $s'$ is not terminal do steps 4.1 to 4.6:

At step 4.1: Choose an action $a \leftarrow \mu(s)$

At step 4.2: Take action a, observe $r_{II},s'$.

At step 4.3: Store transition $(s,a,r_{II},s')$ in replay buffer D.

At step 4.4: Sample b transitions (mini batch) from replay buffer $\{(s,a,r_{II},s')_b\} \sim D$.

At step 4.5: Update policy weights $w_\mu$ minimizing loss. $L_{RL}(\mu\{(s,a,r_{II},s')_b\})$ over the mini-batch by gradient descent method (e.g., maximizing the reward $r_{II}$ for Task 2.).

At step 4.6: Update $s=s'$.

Algorithm 4 outputs a new (e.g., the second policy $\mu$) that maximize the cumulative future reward of the new (e.g. second) task (Task 2).

Referring to FIG. 5, the RL agent 102 receives the state $s_t$ and the reward $r_t$ generated by the reward processor 314 for the second task (Task 2), and the option processor 336 chooses (i.e. selects) one of the learned option policies or primitive actions from the augmented action space 130 to perform a respective action in order to maximize the cumulative future reward reward of the second task (Task 2).

In some embodiments, steps 22, 24, and 26 of the method 20 are repeated for one or more other tasks (e.g. Task 3, Task 4, etc.) to increase the number of learned potential option policies available for learning the second policy $\mu$ at step 28. In such embodiments, the learned option policies are then appended to the action space (i.e., the space of available actions available) and the option policies are used for learning the second policy $\mu$ as described above.

It may be appreciated that example embodiments of the robot 100 can be data driven, may not require human demonstrations, may not require reward/task engineering, have sample efficiency from reusing skills for new tasks, have learned skills which are unique (except for features of zero variance, which are trivial), and can scale to high dimensional problems.

It can be appreciated that example embodiments of the RL agent 102 are scalable to complex tasks, and are data-driven which can avoid hand engineered skills and human demonstrations in example embodiments.

The coding of software for carrying out the above-described methods and functions described is within the scope of a person of ordinary skill in the art having regard to the described example embodiments. Machine-readable code executable by one or more processors of one or more respective devices to perform the above-described method may be stored in a machine-readable medium such as a memory of a vehicle control system or a memory of a neural network controller (not shown). The steps and/or operations in the flowcharts and drawings described herein are for purposes of example only. There may be many variations to these steps and/or operations without departing from the teachings of the described example embodiments. For instance, the steps may be performed in a differing order, or steps may be added, deleted, or modified.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although some example embodiments may be described, at least in part, in terms of methods, a person of ordinary skill in the art will understand that example embodiments are also directed to the various components for performing at least some of the aspects and features of the described methods, be it by way of hardware (digital signal processors (DSPs), application-specific integrated circuits (ASICs), or field programmable gate arrays (FPGAs)), software or a combination thereof. Accordingly, the technical solution of the example embodiments may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

Example embodiments may be embodied in other specific forms without departing from the subject matter of the claims. The described example embodiments are to be considered in all respects as being only illustrative and not restrictive. The described examples intend to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

What is claimed is:

1. A method comprising:
   learning a first policy to maximize a cumulative reward of a first task in an environment, the first policy being learned using a reinforcement learning algorithm and first transition tuples collected in an environment, wherein each first transition tuple includes state, action, reward of the first policy after taking the action;
   extracting a feature network from the neural network;
   computing the variance of each feature output by the feature network;
   selecting at least one feature of the features based on the computed variance;
   for each selected feature, learning an option policy from second transition tuples collected in the environment that maximizes a cumulative feature reward of the selected feature and storing the learned option policy for the selected feature in an augmented action space, wherein each second transition tuple includes state, action, feature reward and next state; and
   learning a second policy to maximize a second cumulative reward for a second task, the second policy learned by choosing one of the learned option policies in the augmented action space and using a reinforcement learning algorithm and third transition tuples collected in an environment, wherein each third transition tuple includes state, the chosen option policy, reward of the chosen learned option policy after taking the action generated by the chosen learned option policy, and next state.

2. The method as claimed in claim 1, wherein selecting at least one feature of the features based on the computed variance comprises selecting at least one feature that exceeds a predetermined threshold variance.

3. The method as claimed in claim 1, wherein the selecting at least one of the features comprises ranking the features from highest variance to lowest variance, and selecting a specified number of features having the highest variance.

4. The method as claimed in claim 1, wherein the feature network generates features that are minimally correlated with each other.

5. The method as claimed in claim 1, wherein each learned option policy maps state to action.

6. The method as claimed in claim 1, wherein the first policy is modeled as a neural network that maps state to action.

7. The method as claimed in claim 1, wherein the first policy is an action that maximizes a value function in a state and wherein the value function is modelled as a neural network that maps state and action to value.

8. The method as claimed in claim 1, further comprising storing, in the augmented action space, primitive actions, and learning the second policy by choosing a primitive action and executing the primitive action for one time step.

9. The method as claimed in claim 1, wherein learning the second policy comprises executing the chosen learned option policy over one or more time steps until a future cumulated reward of the selected learned option policy is maximized.

10. A robot comprising:
memory;
a processing unit configured to execute instructions of an agent stored in the memory to:
  learn a first policy to maximize a cumulative reward of a first task in an environment, the first policy being learned using a reinforcement learning algorithm and first transition tuples collected in an environment, wherein each first transition tuple includes state, action, reward of the first policy after taking the action;
  extract a feature network from the neural network;
  compute the variance of each feature output by the feature network;
  select at least one feature of the features based on the computed variance;
  for each selected feature, learn an option policy from second transition tuples collected in the environment that maximizes a cumulative feature reward of the selected feature and storing the learned option policy for the selected feature in an augmented action space, wherein each second transition tuple includes state, action, feature reward and next state; and
  learn a second policy to maximize a second cumulative reward for a second task, the second policy learned by choosing one of the learned option policies in the augmented action space and using a reinforcement learning algorithm and third transition tuples collected in an environment, wherein each third transition tuple includes state, the chosen option policy, reward of the chosen learned option policy after taking the action generated by the chosen learned option policy, and next state.

11. The robot as claimed in claim 10, wherein at least one feature of the features is selected based on the computed variance comprises selecting at least one feature that exceeds a predetermined threshold variance.

12. The robot as claimed in claim 10, wherein the selection at least one of the features comprises ranking the features from highest variance to lowest variance, and selecting a specified number of features having the highest variance.

13. The robot as claimed in claim 10, wherein the feature network generates features that are minimally correlated with each other.

14. The robot as claimed in claim 10, wherein each learned option policy maps state to action.

15. The robot as claimed in claim 10, wherein the first policy is modeled as a neural network that maps state to action.

16. The robot as claimed in claim 10, wherein the first policy is an action that maximizes a value function in a state and wherein the value function is modelled as a neural network that maps state and action to value.

17. The robot as claimed in claim 1, wherein the processing unit is further configured to execute further instructions of the agent stored in the memory to store, in the augmented action space, primitive actions, and learn the second policy by choosing a primitive action and executing the primitive action for one time step.

18. The method as claimed in claim 1, wherein the second policy is learned by executing the chosen learned option policy over one or more time steps until a future cumulated reward of the selected learned option policy is maximized.

19. A non-transitory computer-readable medium having instructions stored thereon which when executed by an agent of a robot cause the agent to:
  learn a first policy to maximize a cumulative reward of a first task in an environment, the first policy being learned using a reinforcement learning algorithm and first transition tuples collected in an environment, wherein each first transition tuple includes state, action, reward of the first policy after taking the action;
  extract a feature network from the neural network;
  compute the variance of each feature output by the feature network;
  select at least one feature of the features based on the computed variance;
  for each selected feature, learn an option policy from second transition tuples collected in the environment that maximizes a cumulative feature reward of the selected feature and storing the learned option policy for the selected feature in an augmented action space, wherein each second transition tuple includes state, action, feature reward and next state; and
learn a second policy to maximize a second cumulative reward for a second task, the second policy learned by choosing one of the learned option policies in the augmented action space and using a reinforcement learning algorithm and third transition tuples collected in an environment, wherein each third transition tuple includes state, the chosen option policy, reward of the chosen learned option policy after taking the action generated by the chosen learned option policy, and next state.

* * * * *